April 14, 1970  L. J. EWALT  3,506,383
LOW FRICTION GEAR SETS FOR PUMPS AND MOTORS
Filed Aug. 29, 1968
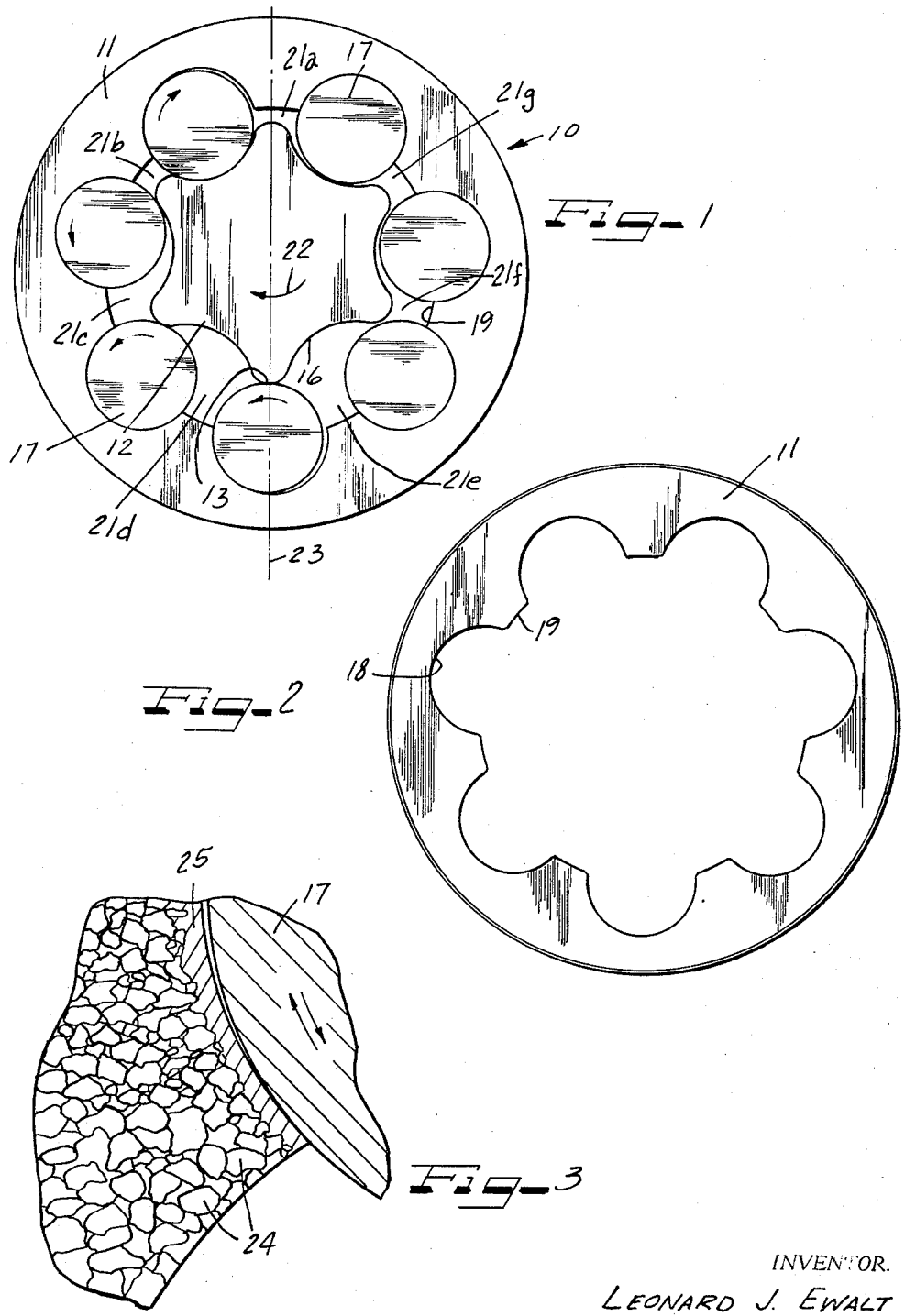
INVENTOR.
LEONARD J. EWALT
BY ATTORNEYS

United States Patent Office 3,506,383
Patented Apr. 14, 1970

3,506,383
LOW FRICTION GEAR SETS FOR PUMPS AND MOTORS
Leonard J. Ewalt, Lafayette, Ind., assignor to TRW Inc., Cleveland, Ohio, a corporation of Ohio
Filed Aug. 29, 1968, Ser. No. 756,255
Int. Cl. F04b 21/08; F04c 1/00, 3/00
U.S. Cl. 418—178       6 Claims

ABSTRACT OF THE DISCLOSURE

A rotor-stator gear set for a fluid pressure device which can be used either as a motor or as a pump, the stator including an internally toothed gear composed of a compacted powdered ferrous metal ring having a plurality of equally circumferentially spaced recesses formed therein, and an externally toothed gear member located within the ring and arranged to mesh with the internally toothed gear member or with roller vanes located thereon, one or both of the engaging surfaces having a thin coating of electroless nickel thereon providing low friction, longer wear life surfaces.

CROSS REFERENCE TO RELATED APPLICATION

This application represents an improvement on the co-pending application of Hollis N. White, Jr., Ser. No. 670,915, filed Sept. 27, 1967, now Patent No. 3,460,481 and assigned to the same assignee as the present application.

BACKGROUND OF THE INVENTION

Field of the invention

This invention is in the field of rotor-stator gear sets for fluid pressure devices wherein the stator is composed of powdered metal and wherein there is provided on the running surface a coating of electroless nickel of substantially uniform thickness which provides a low coefficient of friction, resistance to wear and abrasion, and a bonding strength to the underlying powdered metal compact which approaches the tensile strength of the compact itself.

DESCRIPTION OF THE PRIOR ART

The present invention is particularly applicable to motor-pump hydraulic devices of the type described and claimed in Hudgens U.S. Patent No. 3,289,602. Hydraulic devices of this type have found application where low speed, high torque rotary drives are required such as in augers, conveyors, vehicle wheel drives, and the like. In this type of device, the stator has a greater number of teeth than does the rotor and as the stator and rotor are rotated relative to one another, the rotor moves through a hypocycloidal curve to form alternately expanding and contracting chambers between each pair of adjacent teeth of the internally toothed stator and each tooth of the rotor. In view of the unique construction and operation of this type of gearing, the machining operations required for the stator and the rotor had to meet close tolerances which naturally increased the cost of production. Because of the substantial pressures to which the gear sets may be subjected, the stator and rotor were generally made of a metal having high strength characteristics but also having relatively high coefficients of friction, thereby increasing the power losses within the gear set as well as increasing the operating temperature and the heat transferred to the fluid operating or being pumped by the hydraulic device.

Rotor-stator gear sets composed of compacts of sintered ferrous metal have been used in the past but present certain inherent difficulties. While the techniques of powder metallurgy permit parts of this type to be formed with close dimensional tolerances the sintered compact does not always have the required physical properties with regard to hardness and tensile strength. Consequently, it is frequently necessary to heat treat the sintered metal compacts to achieve the required physical properties. This heat treating, however, can cause dimensional disturbances that require expensive and difficult form grinding operations.

SUMMARY OF THE INVENTION

The present invention provides a low friction gear set for pumps and motors which makes it possible to use non-heat treated sintered powdered metal compacts in the stator assembly. This is accomplished by applying a uniform, thin coating of electroless nickel over the running surfaces of the stator or the rotor, or both, the coating having physical properties which make it particularly suitable for this use. Specifically, the coating consists essentially of nickel with a phosphorous content preferably in the range from 5 to 10%. The coating has a Rockwell C hardness of from 45 to 50 and has a thickness between about 0.0005 to 0.002 inch. The strength of the bond between the coating and the relatively porous ferrous metal is in the range from about 30,000 to 60,000 pounds per square inch. These characteristics provide the gear set with substantial improvements in wear life and low friction operating characteristics, without the necessity of resorting to heat treatment of the powdered metal compact or expensive machining operations.

BRIEF DESCRIPTION OF THE DRAWING

FIGURE 1 is a view in elevation of a gear set which can function as a fluid pump or fluid motor, forming one embodiment of the present invention;

FIGURE 2 is a view in elevation of the stator assembly alone from FIGURE 1; and

FIGURE 3 is a greatly enlarged fragmentary cross-sectional view of the improved low friction surface of the present invention.

DESCRIPTION OF THE PREFERRED EMBODIMENTS

A gear set from a fluid pressure device with which the present invention is particularly applicable is illustrated in FIGURES 1 and 2 of the drawing. Reference numeral 10 indicates generally a gear set, including an internally toothed stator 11 and an externally toothed rotor 12.

The teeth or lobes of the rotor 12 include convex shaped portions 13 uniformly spaced about the central axis of the rotor and separated by concave shaped portions 16. The teeth of the stator 11 may comprise a plurality of angularly spaced, cylindrically shaped vanes 17 which are housed in segmental cylindrically shaped wall forming recesses or pockets 18 opening to an inner peripheral wall 19, all of which are located on the annular stator ring member 11 which is illustrated per se in FIGURE 2. It should be understood, however, that the invention is equally applicable to configurations which do not employ the roller vane type structure, but employs a solid stator structure.

The number of teeth on the rotor 12 is preferably one less than the number of teeth in the stator 11. In the particular embodiment shown, the rotor 12 has a total of six teeth while the stator 11 has seven teeth.

The axis of the rotor 12 is eccentrically disposed with respect to the central axis of the stator 11 so that as the rotor 12 is rotated relative to the stator 11, the rotor teeth 13 mesh with the stator teeth or vanes 17 to impart a hypocycloidal path of movement to the rotor 12 whereby it orbits about the central axis of the stator 11 six times, corresponding to the number of teeth of the rotor 12, for each revolution of the rotor 12.

During this hypocycloidal movement of the rotor 12, the teeth or lobes 13 thereon form, in combination with the teeth 17 of the stator 11 and the inner peripheral wall 19 of the stator alternately expanding and contracting fluid chambers indicated, respectively, at reference numerals 21a through 21g. Assuming that the rotor 12 is being rotated about its central axis in a clockwise direction as indicated by the arrow 22, the fluid chamber 21a has contracted to its minimum volume and further rotation of the rotor 12 will have the effect of expanding the volume of the chamber. At this time, chamber 21b is approaching its minimum volume and chambers 21c and 21d are being contracted. Chambers 21e, 21f and 21g are expanding at this time.

When the device 10 is utilized as a fluid motor, means are provided for communicating the expanding fluid chamber to a source of pressurized fluid and the contracting chambers are communicated with a discharge or an outlet opening. When the device 10 is being used as a pump, the expanding chambers are placed in communication with a fluid inlet and the contracting chambers which comprise the high pressure chambers are placed in communication with a pump discharge or outlet opening. Suitable means for communicating the fluid chambers alternately and successively with the fluid inlet and outlet openings are disclosed, for example, in White U.S. Patent No. 3,288,034.

In the illustrated embodiment of the invention, the teeth 13 and the interconnecting arcuately shaped surface 14 of the rotor 12, and the vanes 17 of the stator 11 are constructed so that the rotor 12 only contacts those of the vanes 17 which are disposed on one side of a diameter which intersects the central axis of the rotor 12 as well as that particular chamber, such as chamber 21a in the condition shown in FIGURE 1, which is contracted to its minimum volume. In FIGURE 1, this diameter is illustrated in broken lines at reference numeral 23. Thus, the teeth 13 which form the contracting chambers 21b, 21c, and 21d are in engagement with their corresponding vanes 17 in the relative positions of the stator 11 and the rotor 12 shown in FIGURE 1, whereas the rotor teeth partially forming the expanding chambers 21e, 21f, and 21g are in slightly spaced relation with their corresponding vanes 17.

In this condition, the vanes 17 will rotate counterclockwise due to the vane action. Vanes adjacent the chambers 21b, 21c, and 21d will rotate if the device is being used as a motor. Vanes adjacent the chambers 21g, 21f and 21e will rotate if the device is being used as a pump.

The diameters of the pocket or recessed walls 18 are greater than the diameters of the vanes 17, as a consequence of which the vanes are capable of moving slightly not only toward the axis of the stator ring 20 but also from side to side. The teeth 13 of the rotor 12 are constructed to permit such movement of the vanes as the rotor 12 rotates and orbits within the stator 11 and as a consequence the peripheral surfaces of the vanes 17 are urged slightly away from the pocket walls 18 by the pressure of the operating fluid such as oil, thereby providing a hydrodynamic oil film between the vanes 17 and the pockets 18. This film not only increases the performance characteristics of the device by reducing the frictional forces between the vanes and the pockets, and thus reduces the power losses of the rotor 12, but also reduces wear and increases the overall operating life of the device.

The stator 11 is formed of a sintered ferrous metal, typically steel. The sintered particles making up the compacted stator 11 are illustrated at reference numeral 24 in FIGURE 3.

In accordance with one form of the present invention, the inside contour of the stator 11 is provided with a coating 25 of electroless nickel which has been found to secure a substantial improvement in the accuracy and wear life of the powdered metal ring 20. Furthermore the provision of the electroless nickel coating 25 has eliminated the necessity of heat treating the stator and consequently has eliminated the necessity for the expensive machining operation which was heretofore required. As a result, the stator 11 can be composed of a powdered ferrous metal ring which has a hardness of less than about 85 on the Rockwell B scale and a tensile strength of less than 50,000 p.s.i.

Electroless nickel plating processes are based upon the reaction of a chemical reducing agent such as sodium hypophosphite and a nickel salt such as nickel chloride in hot aqueous solution to deposit nickel on a catalytic surface. The electroless nickel plating process is characterized by a uniformity in thickness regardless of the shape and size of the plated surface.

The methods employed for cleaning and preparing the metal surface for electroless nickel plating are the same as those used for conventional electroplating. Heavy oxides are removed mechanically, and oil and grease are removed by vapor degreasing. Typical precleaning cycling consists of alkaline cleaning and acid pickling both followed by water rinsing.

Both alkaline and acid electroless nickel baths can be used to produce the nickel coating. Apparently in the case of deposition of electroless nickel deposits on low alloy steels, there is first formed an immersion deposit of nickel on the surface which then catalyzes the reaction to form further deposits of the nickel plating.

Typical alkaline electroless nickel baths and operating conditions are given in the following table:

TABLE I

| | Bath 1 | Bath 2 | Bath 3 |
|---|---|---|---|
| Nickel chloride, g./l | 30 | 45 | 30 |
| Sodium hypophosphite, g./l | 10 | 11 | 10 |
| Ammonium chloride, g./l | 50 | 50 | 50 |
| Sodium citrate, g./l | | 100 | |
| Ammonium citrate, g./l | | | 65 |
| Ammonium hydroxide | To pH | To pH | To pH |
| pH | 8-10 | 8.5-10 | 8-10 |
| Temperature, °F | 195-205 | 195-205 | 195-205 |
| Plating rate, mils/hr | 0.3 | 0.4 | 0.3 |

Typical acid electroless nickel plating baths and conditions are given in the following table:

| | Bath 4 | Bath 5 | Bath 6 |
|---|---|---|---|
| Nickel chloride, g./l | 30 | | 30 |
| Nickel sulfate, g./l | | 20 | |
| Sodium hypophosphite, g./l | 10 | 27 | 10 |
| Sodium hydroxyacetate, g./l | 50 | | 10 |
| Sodium succinate, g./l | | 16 | |
| pH | 4-6 | 4.5-5.5 | 4-6 |
| Temperature, °F | 190-210 | 200-210 | 190-210 |
| Plating rate, mils/hr | 0.5 | 1.0 | 0.4 |

The resulting electroless nickel layer contains about 5 to 10% phosphorous the balance being nickel. The thickness of the coating is controlled to a value of between 0.0005 and 0.002 inch. The coating has a hardness on the Rockwell C scale of from 45 to 50 although this can be increased to a value of about 70 or more by heat treating the plating at 750° F. for one-half to one hour.

The electroless nickel plate provides a deposit which has substantial adhesion to the underlying powdered metal compact. The strength of the bond between the coating and the ring is in the range from about 30,000 to 60,000 pounds per square inch.

Not only is the wear resistance of the powdered metal ring increased, but the corrosion resistance is also increased by the inclusion of the electroless nickel coating. The abrasion resistance is particularly good, and is better than that achieved with electro-deposited nickel. The coefficient of friction of the resulting coating is approximately one-third that of steel. As far as other physical characteristics of the electroless nickel coating are concerned, the coating typically has a specific gravity of 7.5 grams per cubic centimeter, a melting point of about 1635° F., a coefficient of thermal expansion of $7.22 \times 10^{-6}$ inches per inch per degree Fahrenheit, a thermal conductivity ranging from about 0.0055 to 0.0075 cal./cm. sec./°

F., and an average electrical resistance of about 60 microohms per centimeter.

From the foregoing, it will be understood that the improved gear sets of the present invention provide substantial improvements in the manner of wear and accuracy of a powdered metal element without the necessity of expensive heat treating and machining operations. It will also be understood that various modifications can be made to the described embodiment without departing from the scope of the present invention.

I claim as my invention:

1. A fluid pressure device comprising an interally toothed gear member comprising a compacted powdered ferrous metal ring having an inner peripheral wall and a plurality of equally circumferentially spaced recesses formed in the ring and opening to said peripheral wall, and an externally toothed gear member located within said ring and arranged to mesh with said internally toothed gear member, at least one of the meshing surfaces having a thin coating of electroless nickel thereon providing a low friction, longer wear life surface for said device.

2. The fluid pressure device of claim 1 in which said coating has a hardness on the Rockwell C scale of from 45 to 50.

3. The fluid pressure device of claim 1 which the thickness of said coating is between 0.0005 and 0.002 inch.

4. The fluid pressure device of claim 1 in which said coating consists essentially of nickel containing from 5 to 10% by weight phosphorous.

5. The fluid pressure device of claim 1 in which said coating is on said powdered ferrous metal ring and the ring underlying said coating has a Rockwell B hardness of less than 85 and a tensile strength of less than 50,000 p.s.i.

6. The fluid pressure device of claim 5 in which the strength of the bond between the coating and the ring is in the range from 30,000 to 60,000 pounds per square inch.

References Cited

UNITED STATES PATENTS

| | | | |
|---|---|---|---|
| 1,021,180 | 3/1912 | Clifton | 103—126 |
| 2,664,326 | 12/1953 | Kuzmick | 308—241 |
| 3,212,865 | 10/1965 | Miller | 29—196.3 |
| 3,418,028 | 12/1968 | Watson et al. | 308—241 |
| 3,452,680 | 7/1969 | White | 103—126 |

HENRY F. RADUAZO, Primary Examiner

U.S. Cl. X.R.

29—182.3; 308—241